Figure 1:
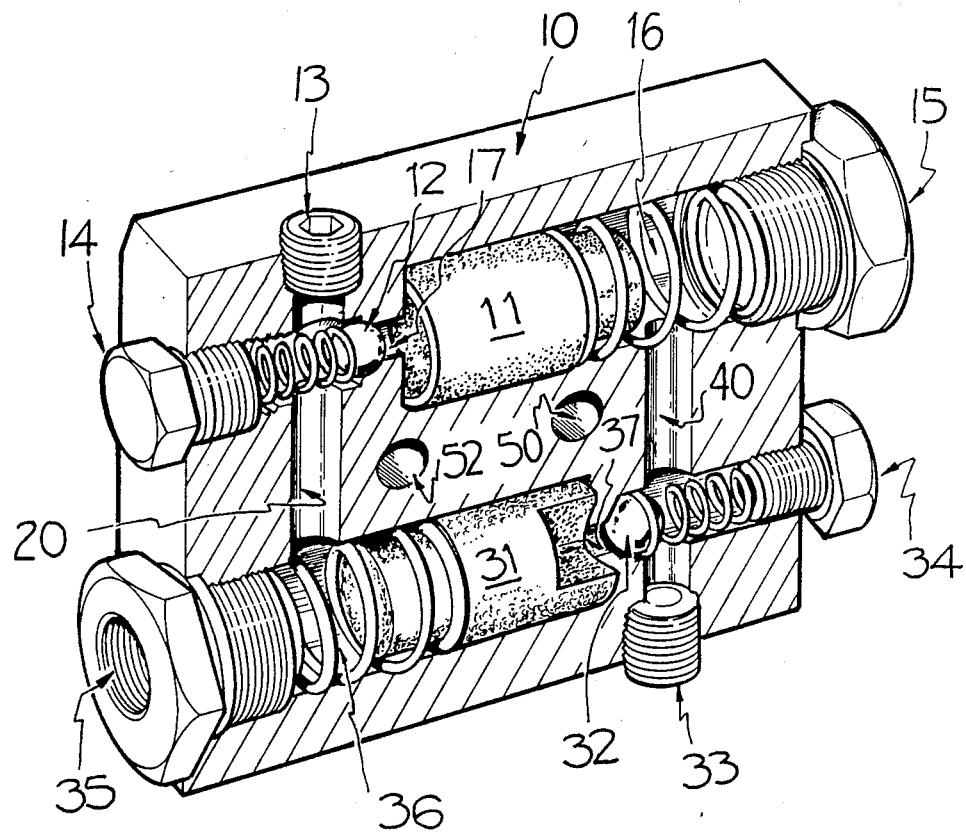

United States Patent [19]

Blood

[11] Patent Number: 4,923,602

[45] Date of Patent: May 8, 1990

[54] BI-DIRECTIONAL FLOW FILTER

[76] Inventor: Neil J. Blood, 8 Mitchel Street, Wongan Hills, Australia, 6603

[21] Appl. No.: 282,491

[22] Filed: Dec. 12, 1988

[51] Int. Cl.⁵ .............................................. B01D 35/30
[52] U.S. Cl. .................................. 210/117; 210/136; 210/323.1; 210/453; 137/493.8
[58] Field of Search ............... 210/117, 136, 316, 439, 210/446, 453, DIG. 6, 137, 323.1; 137/493.8

[56] References Cited

U.S. PATENT DOCUMENTS

| | | | |
|---|---|---|---|
| 3,190,445 | 6/1965 | Rosaen | 210/136 |
| 3,322,281 | 5/1967 | Gulick | 210/136 |
| 3,985,652 | 10/1976 | Cooper | 210/97 |
| 3,996,137 | 12/1976 | Cooper | 210/130 |
| 4,003,397 | 1/1977 | Cooper | 137/493.9 |
| 4,009,572 | 3/1977 | Cooper | 60/454 |
| 4,029,580 | 6/1977 | Lange | 210/136 |

Primary Examiner—W. Gary Jones
Assistant Examiner—Matthew O. Savage
Attorney, Agent, or Firm—Banner, Birch, McKie & Beckett

[57] ABSTRACT

A bi-directional flow filter including a block having first and second peripheral ports with a forward line of flow through the block from the first peripheral port to the second peripheral port and a reverse line of flow through the block from the second peripheral port to the first peripheral port. A first check valve and a first filter element are disposed in the forward line of flow to allow flow only in the forward direction through the first filter element. A second check valve and a second filter element disposed in the reverse line of flow to allow fluid flow only in the reverse direction through the second filter element. First and second filter element cavities are positioned in the block in a generally side-by-side relation with the first port in one block face and the second port in the opposite block face. First and second filter elements are disposed in their respective cavities and filter in the respective forward and reverse directions fluid entering the first and second ports, respectively.

17 Claims, 1 Drawing Sheet

BI-DIRECTIONAL FLOW FILTER

This invention relates to a filter for filtering fluids; in particular, hydraulic fluids such as hydraulic oil, as used in a wide range of hydraulic actuated systems.

In many field systems, such as hydraulic systems, fluid flows in opposite directions at different points in time in the operating cycle of the system and it is desirable to be able to filter the fluid when flowing in either direction. At the present time, this is only achieved by having a separate conduits to carry the fluid in respective directions with appropriately positioned conventional one way filters in each line or conduit to filter the fluid as it flows in the respective directions. Such an arrangement is cumbersome and expensive in that it necessitates duplication of the fluid lines and the provision of two independent filters.

In other systems, a single filter is used and the fluid flows in the respective direction therethrough. However, this system has the problem that the contaminants are not filtered out of the system, but are just shunted backwards and forwards on either side of the filter. Further, most filters are constructed to only operate with the fluid passing in one direction and the use of such filters in a reverse flow situation leads to rapid breakdown of the filter element and potentially increased contamination of the fluid.

It is therefore the principal object of the present invention to provide a filter for use in fluid circuits in which the fluid flows at different times in either direction within the circuit.

In accordance with one aspect of the present invention, there is provided a filter for filtering fluid flowing in either direction comprising:
(a) a block having first and second peripheral ports,
(b) a forward line of flow arranged in said block from the first peripheral port to the second peripheral port,
(c) a reverse line of flow arranged in said block form the second peripheral port of the first peripheral port,
(d) a first check valve means and a first filter means disposed in the forward line of flow to allow fluid flow in the forward direction and to filter said forward fluid flow, and
(e) a second check valve means and a second filter means disposed in the reverse line of flow to allow fluid flow in the reverse direction and to filter said reverse fluid flow.

Conveniently, the filter means are provided in the form of filter elements.

Conveniently, the forward line of flow includes a first filter element cavity and a first passage and the reverse line of flow includes a second filter element cavity and a second passage. The first and second filter element cavities are in direct communication with the first and second peripheral ports respectively, with the first and second filter elements located in their respective cavities and arranged to filter in the respective forward and reverse directions fluid entering the first and second ports respectively.

Conveniently, the first passage communicates the downstream side of the first filter element with the second port to facilitate filtered fluid from the first filter element exiting the second port, and the second passage communicates the downstream side of the second filter element with the first port to facilitate filtered fluid from the second filter element exiting the first port.

Conveniently, the first and second check valve means may be located in either the respective cavities or the respective passages, and preferably on the downstream side of the respective filter elements. In a preferred embodiment, parts of the cavities overlap with parts of the respective passages.

In accordance with another aspect of the present invention, there is provided a filter for filtering fluid flowing in either direction through a conduit comprising, a block having a first and second peripheral port adapted to be connected to respective sections of the conduit, a first and second filter element cavity in the block, each supporting therein a filter element to respectively filter fluid passing therethrough in a respective single direction, the first filter element cavity being in direct communication with the first peripheral port so fluid entering the first port is filtered by the filter element in the first cavity, the second filter element cavity being in direct communication with the second peripheral port so fluid entering the second port is filtered by the filter element in the second cavity, a first passage in the block communicating the downstream side of the filter element in the first filter element cavity with the second peripheral port, a second passage in the block communicating the downstream side of the filter element in the second filter element cavity with the first peripheral port, and check valve means to control the flow of fluid in each said first and second passages so fluid may only flow through each passage in the direction to the respective peripheral ports.

Conveniently, the check valve means are provided in a section of the respective passages adjacent to where the passage communicates with the filter cavity.

Conveniently, the filter element cavities are provided in the block in a generally side by side relation with the first peripheral port in one face of the block and the second peripheral port in the opposite face of the block.

Conveniently, the respective ports are provided with internal threads or threaded elements whereby conventional fluid conduits or lines can be conveniently attached thereto.

In a preferred filter construction as above described, when the fluid enters the block through the first peripheral port, it will be filtered by the filter element in the first filter element cavity, then pass through the check valve means in the first passage and flow into the second filter element cavity and hence out through the second peripheral port. When the fluid enters the block through the second peripheral port, it will be filtered by the filter element in the second filter element cavity, then pass through the check valve means in the second passage and flow into the first filter element cavity and hence out through the first peripheral port.

Preferably, the first and second passage communicate with the second and first filter element cavities respectively, at a location located between the filter element and the peripheral port so that fluid entering the filter element cavity from the passage does not create significant flow about the filter element which may cause contaminants removed by the filter element to be picked up in the fluid flow.

The invention will now be described with reference to the accompanying drawing, which is a central sectional view of the filter in accordance with a preferred embodiment of the present invention.

Referring now to the drawing;

The rectangular block (10) has two peripheral ports (15,35) in opposite faces of the block. Two elongated filter element cavities (16,36) extend generally parallel to each other in the block. Each cavity (16,36) is in direct communication with a respective port (15,35). Two filter elements (11,31) are located in their respective cavities (16,36). Each filter element (11,31) is arranged to filter in a respective single direction fluid entering the respective associated port (15,35).

A passage extends in the block communicating the downstream side of a filter element (11) with the non-associated port (35) to facilitate filtered fluid from the filter element (11) exiting the non-associated port (35). Another passage extends in the block communicating the downstream side of the outer filter element (31) with the other port (15) to facilitate filtered fluid from the other filter element (31) exiting the other port (15).

Thus, a forward line of flow is formed extending from one port (15) to the other port (35) and a reverse line of flow is formed extending from the other port (35) to said one port (15).

Two check valve means (12,32) are provided on the downstream side of the respective filter elements (11,31) to allow filtered fluid flow in the respective single direction through the respective forward and reverse lines of flow. It is appreciated that the check valve means may be located in the respective cavities or the respective passages, and sections of the cavities and passages may also overlap. Further, the check valve means may be provided on the upstream side of the respective filter elements (11,31) to prevent any fluid flow in a respective line in the direction opposite to that of the line of flow.

Each cavity has an intermediate channel (17,37) of narrower cross section than the general cross section of the cavity. Each filter element (11,31) is securely seated at the intermediate channel interface which is on the side towards the port (15,35) and orientated such that fluid flowing from the port (15,35) to the intermediate channel (17,37) will be filtered.

Each passage includes a subsidiary conduit (20,40). The cavities (16,36) are interconnected by the subsidiary conduits (20,40) extending generally parallel to each other in the block. Each subsidiary conduit (20,40) connects an associated cavity (16,36) on one end and the other non-associated cavity (36,16) on the other end. It intersects the other non-associated cavity at a location located between the intermediate channel of the other cavity and the non-associated port (35,15) distant from the filter element in the other cavity.

In the construction of the filter block (10), there are formed extended end portions to each cavity (16,36) so that each cavity has a second opening on the opposite side of the block (10) to that of its port (15,35). The second openings on opposite sides of the block (10) are closed by plugs (14,34).

Likewise, extended end portions to the subsidiary conduits on one end are formed so that each subsidiary conduit (20,40) has an opening on a side of the block. These openings on opposite sides of the block (10) are closed by plugs (13,33). Second extended end portions (not shown) to the subsidiary conduits may also be formed on the other end such that the conduits extend through the block.

It will be appreciated that these openings facilitate quick and easy assembling and dissembling of the parts of the filter and allow for quick and easy cleaning of the cavities and the subsidiary conduits in the block, for example, by flushing.

The general cross section of the cavities (16,36) is wider than that of the subsidiary conduits (20,40) which is wider than the intermediate channels (17,37) of the cavities. The relative general cross sections of the cavities, the subsidiary conduits and the intermediate channels are such that the fluid flow from each cavity through its intermediate channels into its associated subsidiary conduit is substantially without restrictions under operating fluid pressure.

In the continuous passage downstream of the filter element between the intermediate channel 917,37) of each cavity (16,36) and the intersection between its associated subsidiary conduit (20,40) and the other non-associated cavity (36,16), the check valves (12,32) may be provided. Each check valve is securely seated at the other interfaces of the respective intermediate channels and orientated such that fluid flow from each cavity (16,36) to its associated subsidiary conduit (20,40) is not restricted but reverse fluid flow in the opposite direction is prevented.

When in operation, the block (10) is connected to the hydraulic circuit having fluid sources or reservoirs by pipes or conduits attached to the ports (15,35); and may be mounted on the hydraulic implement by the bore holes (50,52) in the block.

In a forward-flow operating mode, contaminated fluid enters the block at port (15) under a pressure. The fluid travels along the cavity (16) and is filtered by the filter element (11) and allowed passage by check valve (12). The filtered fluid then travels along subsidiary conduit (20) in the other cavity (36) and exits the block at the other port (35) on the opposite side of the block to port (15).

However, any fluid that enters the other subsidiary conduit (40) will activate the other check valve (32) and thus, reverse fluid flow from the other subsidiary conduit (40) to the other cavity (36) will be prevented. Any contamination deposited on the other filter element (31) will not be set free by any reverse fluid flow and subsequently collected by the filtered fluid abovementioned.

In a reverse-flow operating mode, contaminated fluid enters the block at the other port (35) and exits the block at port (15) on the opposite side of the block. The respective identical parts of the filter perform their respective opposite corresponding roles as in the forward-flow operating mode.

During either operating mode, pressure gauge can be connected to openings of subsidiary conduits (20,40) to continuously monitor the fluid pressure inside the block and allow for control thereof.

In the preferred embodiment, the filter element is a sintered bronze filter element, for example 40 micron, and further, the check valve is a metallic ball valve, for example, a chrome ball, securely positioned by a spring of predetermined rate which is retained by the plugs (14,34). Conveniently, the filter element is securely seated by a spring of sufficient rate which is retained by connecting elements between the fluid source pipes and the ports (15,35). The relative rate of the springs is dependent upon the operating fluid pressure. In practice, the hydraulic system may be operated under a fluid pressure of 2500 p.s.i. and the corresponding fluid flow rate may be 15 gal/min.

I claim:

1. A filter for filtering fluid flowing in either direction through a conduit, said filter comprising:

a block having first and second peripheral ports adapted to be connected to respective sections of bi-directional fluid flow conduit;

first and second filter element cavities in said block, each supporting therein a filter element to respectively filter fluid passing therethrough in a respective single direction, said first filter element cavity being in direct communication with said first peripheral port so fluid entering said first port is filtered by said filter element in said first cavity, said second filter element cavity being in direct communication with said second peripheral port so fluid entering said second port is filtered by said filter element in said second cavity, said filter element cavities being positioned in said block in a generally side by side relation with said first peripheral port in one face of said block and said second peripheral port in the opposite face of said block;

a first passage in said block communicating the downstream side of said filter element in said first filter element cavity with said second peripheral port;

a second passage in said block communicating the downstream side of said filter element in said second filter element cavity with said first peripheral port; and check valve means for controlling the flow of fluid in each said first and second passages so fluid can only flow through each passage in the direction to said respective peripheral ports.

2. A filter according to claim 1, wherein said first and second check valve means are located in said respective passages, at a location adjacent to where said passage communicates with said filter cavity.

3. A filter according to claim 1, wherein said first passage communicates with said second filter element cavity on the upstream side of said filter element therein and said second passage communicates with said first filter element cavity on the upstream side of said filter element therein so that for each direction of flow, exiting filtered fluid entering said filter element cavity from said passage does not create significant flow about said filter element therein which can cause contaminants moved by said filter element to be picked up in the exiting filtered fluid flow.

4. A filter according to claim 1, further comprising intermediate channels having reduced cross sections formed in said respective cavities with said filter elements located at said upstream channel interface and said check valve means located at the downstream channel interface.

5. A filter according to claim 1, wherein each said passage includes a subsidiary conduit positioned in said block, said conduits extending in a generally side by side relation interconnecting said cavities.

6. A filter according to claim 5, wherein at least one end of each said conduit extends through said block providing at least one through hole in a face of said block, said holes being closed by plugs.

7. A filter according to claim 1, 3, 5, or 6, wherein each cavity extends through said block providing another opening in a face of said block opposite said port, said openings being closed by plugs.

8. A filter for filtering fluid flowing in either direction, said filter comprising:

a block having first and second peripheral ports, a forward line of flow arranged in said block from said first peripheral port to said second peripheral port and including a first filter element cavity, a reverse line of flow arranged in said block from said second peripheral port to said first peripheral port and including a second filter element cavity, first check valve means and a first filter element disposed in said forward line of flow for allowing fluid flow in the forward direction and to filter said forward fluid flow, second check valve means and a second filter element disposed in said reverse line of flow for allowing fluid flow in the reverse direction and to filter said reverse fluid flow, said first and second filter element cavities communicating with said first and second peripheral ports, respectively, with said first and second filter elements located in their respective cavities and arranged to filter in the respective forward and reverse directions fluid entering said first and second ports, respectively, and said filter element cavities being positioned in said block in a generally side-by-side relation with said first peripheral port in one face of said block and said second peripheral port in the opposite face of said block.

9. A filter according to claim 8, wherein said forward line of flow includes a first passage communicating the downstream side of said first line element with said second port to facilitate filtered fluid from said first filter element exiting said second port, and said reverse line of flow includes a second passage communicating the downstream side of said second filter element with said first port to facilitate filtered fluid from said second filter element exiting said first port.

10. A filter according to claim 8, wherein said first and second check valve means are located on the downstream side of their respective filter elements.

11. A filter according to claim 9, wherein said first and second check valve means are located in the respective passages.

12. A filter according to claim 9, wherein each said passage includes a subsidiary conduit in said block, said conduits extending in a generally side-by-side relation interconnecting said cavities.

13. A filter according to claim 12, wherein at least one end of each said conduit extends through said block providing at least one through-hole in a face of said block, said holes being closed by plugs.

14. A filter according to claim 8 or 9, further comprising intermediate channels having reduced cross section formed in the respective cavities with said filter elements located at the upstream channel interface and said check valve means located at the downstream channel interface.

15. A filter according to claim 8, 9, 12 or 13, wherein each said cavity extends through said block providing another opening in a face of said block opposite said port, said openings being closed by plugs.

16. A filter according to claim 8 or 1, wherein said respective ports are provided with internal threads such that fluid conduits can be attached thereto.

17. A filter according to claim 8 or 1, wherein said respective ports include threaded elements so that fluid lines can be attached thereto.

* * * * *